May 18, 1943.  A. O. CODNEY  2,319,533
CHARGING COVER
Filed Aug. 15, 1941
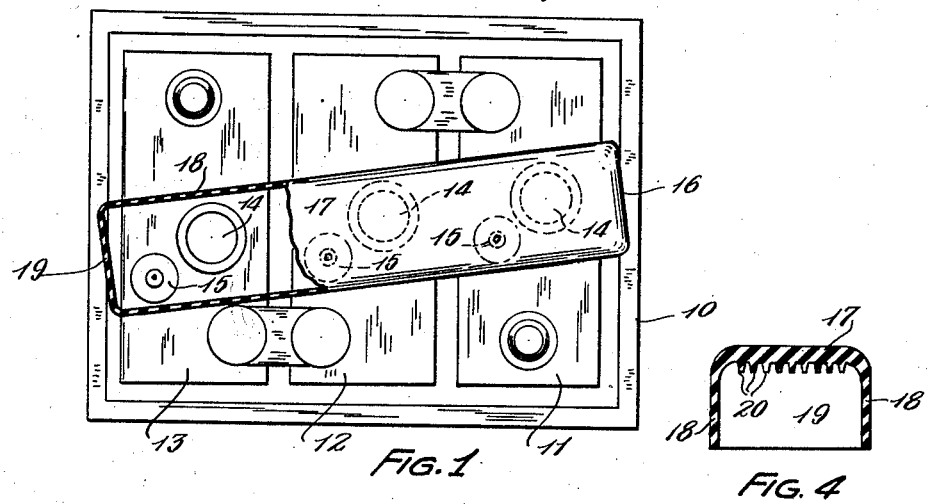
Fig. 1
Fig. 4
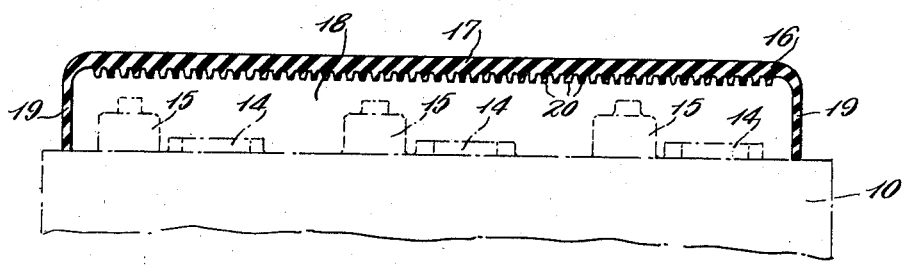
Fig. 2
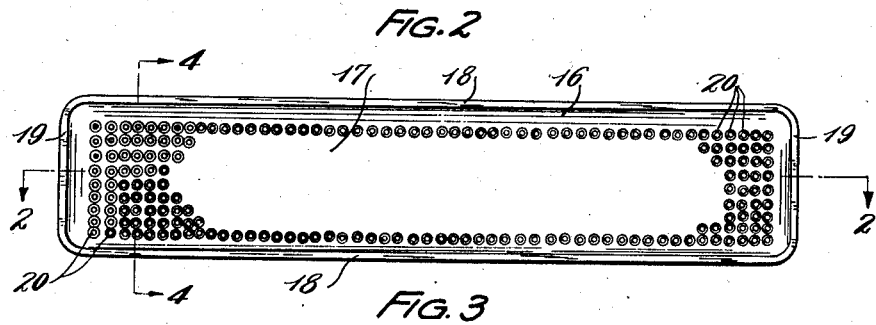
Fig. 3
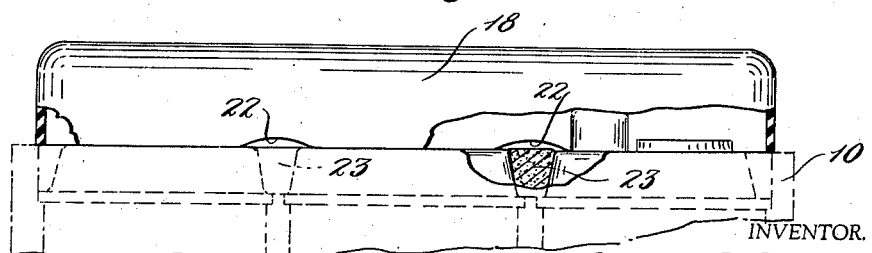
Fig. 5
INVENTOR.
ARTHUR O. CODNEY
BY Kwis Hudson & Kent
ATTORNEYS Patented May 18, 1943

2,319,533

UNITED STATES PATENT OFFICE 2,319,533

CHARGING COVER

Arthur O. Codney, Cleveland Heights, Ohio, assignor to Willard Storage Battery Company, Cleveland, Ohio, a corporation of West Virginia Application August 15, 1941, Serial No. 406,993

3 Claims. (Cl. 136—163)

This invention relates to improvements in charging covers, that is to say covers for temporarily enclosing the vent openings of a storage battery during the charging or recharging of the battery.

During the charging of a storage battery there is a considerable evolution and discharge of hydrogen and oxygen gases. The cells of the battery must be vented to permit these gases to escape. The gases form as bubbles on the plates and when they are discharged they carry with them more or less of the sulphuric acid electrolyte in the form of vapor and fine spray. It is highly desirable to prevent the deposit of this spray on the battery cover and its dissemination in the atmosphere of the room. It is also necessary for the attendant at intervals to take readings with a hydrometer to determine the state of charge of the battery, and the performance of this operation should not be unnecessarily delayed by the withdrawal and replacement of vent plugs. During the charging operation, furthermore, it is desirable to spray water over the top of the battery for the purpose of keeping down the temperature.

One of the objects of the present invention is the provision of means, usable during the charging operation, for covering and uncovering the filler openings in the various cells of a storage battery simultaneously and quickly, and preventing cooling water from entering the battery cells through such openings.

Another object is the provision of a cover of this character which shall be adaptable for use upon batteries of different sizes.

Another object is the provision in a cover of this kind of means for catching the spray and condensing the vapor directly above the vent openings and causing this liquid to drop back through the latter openings into the battery cells.

Other objects and features of novelty will appear as I proceed with the description of that embodiment of the invention which, for the purposes of the present application, I have illustrated in the accompanying drawing, in which Fig. 1 is a plan view partly in horizontal section of a storage battery of the automobile type showing my charging cover in place thereupon.

Fig. 2 is a vertical longitudinal sectional view on a larger scale.

Fig. 3 is a bottom plan view of the cover.

Fig. 4 is a cross-sectional view taken substantially on the line 4—4 of Fig. 3, and Fig. 5 is a side view partly in section, showing a modified form of cover.

Referring to Figs. 1 and 2, 10 is a lead-acid storage battery. In the illustrated instance it comprises three cells 11, 12 and 13, which is the usual number employed in automobile batteries, but the invention is equally adapted to batteries having a greater or lesser number of cells. In each cell there is a filling opening 14 adapted to take a conventional filler plug or cap, not illustrated, that is by threading the plug into the filler opening. In the illustrated instance each cell is also provided with a venting device 15 separate from the filling well. These devices have no bearing upon the present invention, but their presence on many modern batteries must be taken into consideration in determining the proportions of a charging cover of the nature of that here disclosed.

The charging cover of the present invention is an elongated trough-shaped member 16 used in an inverted position and formed of acid resistant material, preferably semi-soft rubber. It comprises an upper wall 17, two side walls 18 and two end walls 19. The side and end walls have flush bottom edges which are adapted to rest upon the upper surface of the battery, as indicated in Figs. 1 and 2, surrounding the filler openings. In batteries where vent openings separate from the filler openings are employed the cover is caused to enclose those vent openings also.

On the under surface of the top 17 I mold a great number of small closely-spaced depending points 20 which collectively occupy nearly all of the surface of the under side of the cover top, so that in spite of variations in size and design one cover may be adapted for use on a variety of batteries, and the space above a filler opening will always be surmounted by an area of points 20.

When a battery is to be charged all of its screw plugs are removed and my cover is placed on the battery in position to enclose all of its filler openings and its separate vent openings also, if present. When hydrometer readings are to be taken, the cover is lifted and placed to one side, and when the readings are finished the cover is placed quickly and easily. During the charging operation spray and vapors are ejected through the open filler openings and collect or are condensed on the points 20 directly above the openings. The increase of cooling surface due to the points assists in the condensation incidentally, but the primary function of the points is to localize the spray and condensate above the filler openings so that it will fall back into the battery and not flow laterally along the cover before it falls.

While the joint between the lower edge of the rubber cover and the upper surface of the battery is fairly close it is not intended to form a seal, and in fact provision must be made for the escape of gas accumulating under the cover. In case there should be a tendency to build up pressure there the cover would, of course, rise sufficiently to relieve the pressure.

In the modification illustrated in Fig. 5, the side walls of the cover are cut away at 22 where they extend over the sealing surfaces 23 between cell covers. During the spraying of water onto the battery the water tends to adhere to the side walls of the cover, and upon drying to leave a mark on the sealing compound. These arches 22 tend to divert the water and avoid such markings.

Batteries having certain types of self-leveling or non-overfill construction may require that vent plugs be screwed on into operating position in order to insure adequate venting of the cells. In such cases the present invention is useful however, for the cover may still be used to prevent acid spray from being discharged into the atmosphere and to protect the openings when a water spray is used to cool the battery.

Variations from the described structure may be employed. Accordingly I desire it to be understood that the scope of the invention is to be regarded as defined exclusively by the appended claims rather than the foregoing description or the accompanying illustration.

Having thus described my invention, I claim:

1. In combination with a storage battery having a cover with a filling opening therein, a charging cover adapted to be supported on the upper surface of the battery and to extend over and cover the filling opening in said cover, said charging cover having projections on the under surface thereof for causing spray or condensed vapors from the filling opening to cling to the projections above the filling opening and to drop back into the battery through said opening.

2. In combination with a multi-cell battery having a cover for each cell with a filling opening therein, a charging cover adapted to be supported on said covers and to extend over and cover all of the filling openings of the battery, said charging cover having projections on the under surface thereof for causing spray or condensed vapors from the filling openings of the different cells to cling to the projections above the filling openings and to drop back into the battery through said openings.

3. A charging ocover for storage batteries, which comprises an elongated member having a top wall, side walls, and end walls, the side and end walls being adapted to rest upon the upper surface of a storage battery and to enclose the openings of all of the cells of the battery, said top wall having closely-spaced points depending from its under surface, whereby the major portion of the vapors and spray rising from the cell openings during the charging of the battery condense and collect upon the points directly above the openings and drop from said points through said cell openings back into the battery.

ARTHUR O. CODNEY.